US006931545B1

(12) United States Patent
Ta et al.

(10) Patent No.: US 6,931,545 B1
(45) Date of Patent: Aug. 16, 2005

(54) SYSTEMS AND METHODS FOR INTEGRITY CERTIFICATION AND VERIFICATION OF CONTENT CONSUMPTION ENVIRONMENTS

(75) Inventors: Thanh Ta, Huntington Beach, CA (US); Xin Wang, Los Angeles, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 819 days.

(21) Appl. No.: 09/649,838

(22) Filed: Aug. 28, 2000

(51) Int. Cl.[7] .................... G06F 11/30; G06F 12/14; H04L 9/32; H04L 9/00
(52) U.S. Cl. .................... 713/200; 713/156; 713/187
(58) Field of Search .............................. 713/200, 156, 713/187

(56) References Cited

U.S. PATENT DOCUMENTS

| | | |
|---|---|---|
| 3,263,158 A | 7/1966 | Janis |
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,220,991 A | 9/1980 | Hamano et al. |
| 4,278,837 A | 7/1981 | Best |
| 4,323,921 A | 4/1982 | Guillou |
| 4,442,486 A | 4/1984 | Mayer |
| 4,529,870 A | 7/1985 | Chaum |
| 4,558,176 A | 12/1985 | Arnold et al. |

(Continued)

FOREIGN PATENT DOCUMENTS

EP 0 084 441 7/1983

(Continued)

OTHER PUBLICATIONS

International Search Report for PCT/US01/26634, dated Mar. 13, 2002 (5 pages).

(Continued)

*Primary Examiner*—Gilberto Barrón, Jr.
*Assistant Examiner*—Jung W Kim
(74) *Attorney, Agent, or Firm*—Marc S. Kaufman; Nixon Peabody, LLP

(57) ABSTRACT

A content provider, such as a document publisher or distributor, provides, for example, protected content to a user, for consumption within a trusted user environment. By providing integrity certification and verification services, the authenticity of the content consumption environments can be verified. The content provider forwards to the user a protected version of the digital content which includes, for example, a license agreement and an integrity profile identification. The profile includes, for example, the applications and system components that are allowed to be used in conjunction with the protected content. Additionally, the content provider initiates a request for an integrity profile. This request for the integrity profile is forwarded to an integrity certification and verification device. The integrity certification and verification device can, for example, if an integrity profile does not already exist for the requested applications and/or systems components, query a content consumption system/application provider, who, for example, has supplied the system components to the user. The content consumption system/application provider returns to the integrity certification and verification device authentication information about the particular applications or system components. The authentication information allows a comparison, or integrity verification, to be made between an application and/or system component on a user's system, and the original application or system component as distributed by the content consumption system/application provider.

136 Claims, 10 Drawing Sheets

U.S. PATENT DOCUMENTS

| | | |
|---|---|---|
| 4,593,376 A | 6/1986 | Volk |
| 4,614,861 A | 9/1986 | Pavlov et al. |
| 4,644,493 A | 2/1987 | Chandra et al. |
| 4,658,093 A | 4/1987 | Hellman |
| 4,713,753 A | 12/1987 | Boebert et al. |
| 4,796,220 A | 1/1989 | Wolfe |
| 4,817,140 A | 3/1989 | Chandra et al. |
| 4,827,508 A | 5/1989 | Shear |
| 4,868,376 A | 9/1989 | Lessin et al. |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder, Sr. et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards, Jr. |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,291,596 A | 3/1994 | Mita |
| 5,301,231 A | 4/1994 | Abraham et al. |
| 5,311,591 A | 5/1994 | Fischer |
| 5,319,705 A | 6/1994 | Halter et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,394,469 A | 2/1995 | Nagel et al. |
| 5,410,598 A | 4/1995 | Shear |
| 5,412,717 A | 5/1995 | Fischer |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,499,298 A | 3/1996 | Narasimhalu et al. |
| 5,502,766 A | 3/1996 | Boebert et al. |
| 5,504,814 A | 4/1996 | Miyahara |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,539,735 A | 7/1996 | Moskowitz |
| 5,563,946 A | 10/1996 | Cooper et al. |
| 5,568,552 A | 10/1996 | Davis |
| 5,621,797 A | 4/1997 | Rosen |
| 5,629,980 A | 5/1997 | Stefik et al. |
| 5,633,932 A | 5/1997 | Davis et al. |
| 5,634,012 A | 5/1997 | Stefik et al. |
| 5,638,443 A | 6/1997 | Stefik et al. |
| 5,649,013 A | 7/1997 | Stuckey et al. |
| 5,655,077 A | 8/1997 | Jones et al. |
| 5,708,717 A | 1/1998 | Alasia |
| 5,715,403 A | 2/1998 | Stefik |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,748,783 A | 5/1998 | Rhoads |
| 5,757,907 A | 5/1998 | Cooper et al. |
| 5,761,686 A | 6/1998 | Bloomberg |
| 5,765,152 A | 6/1998 | Erickson |
| 5,768,426 A | 6/1998 | Rhoads |
| 5,825,892 A | 10/1998 | Braudaway et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,940,504 A | 8/1999 | Griswold |
| 5,943,422 A | 8/1999 | Van Wie et al. |
| 5,949,876 A | 9/1999 | Ginter et al. |
| 5,982,891 A | 11/1999 | Ginter et al. |
| 5,999,949 A | 12/1999 | Crandall |
| 6,006,332 A | 12/1999 | Rabne et al. |
| 6,047,067 A | 4/2000 | Rosen |
| 6,112,181 A | 8/2000 | Shear et al. |
| 6,115,471 A | 9/2000 | Oki et al. |
| 6,134,243 A | 10/2000 | Jones et al. |
| 6,135,646 A * | 10/2000 | Kahn et al. ................ 709/217 |
| 6,138,119 A | 10/2000 | Hall et al. |
| 6,157,721 A | 12/2000 | Shear et al. |
| 6,185,683 B1 | 2/2001 | Ginter et al. |
| 6,226,618 B1 | 5/2001 | Downs et al. |
| 6,233,684 B1 | 5/2001 | Stefik et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,292,569 B1 | 9/2001 | Shear et al. |
| 6,301,660 B1 | 10/2001 | Benson |
| 6,327,652 B1 * | 12/2001 | England et al. ................ 713/2 |
| 6,330,670 B1 | 12/2001 | England et al. |
| 6,345,256 B1 | 2/2002 | Milsted et al. |
| 6,363,488 B1 | 3/2002 | Ginter et al. |
| 6,389,402 B1 | 5/2002 | Ginter et al. |
| 6,487,663 B1 | 11/2002 | Jaisimha et al. |

FOREIGN PATENT DOCUMENTS

| | | |
|---|---|---|
| EP | 0 180 460 | 5/1986 |
| EP | 0 332 707 | 9/1989 |
| EP | 0 651 554 | 5/1995 |
| EP | 0 668 695 | 8/1995 |
| EP | 0 715 241 | 6/1996 |
| EP | 0 725 376 | 8/1996 |
| GB | 2 136 175 | 9/1984 |
| GB | 2 236 604 | 4/1991 |
| JP | 62-241061 | 10/1987 |
| JP | 64-068835 | 3/1989 |
| JP | 04-369068 | 12/1992 |

| | | |
|---|---|---|
| JP | 05-268415 | 10/1993 |
| JP | 06-175794 | 6/1994 |
| JP | 06-215010 | 8/1994 |
| JP | 07-084852 | 3/1995 |
| JP | 07-200317 | 8/1995 |
| JP | 07-244639 | 9/1995 |
| WO | WO 92/20022 | 11/1992 |
| WO | WO 93/01550 | 1/1993 |
| WO | WO 94/01821 | 1/1994 |
| WO | WO 96/24092 | 8/1996 |
| WO | WO 97/48203 | 12/1997 |
| WO | WO 98/11690 | 3/1998 |
| WO | WO 98/42098 | 9/1998 |
| WO | WO 98/43426 | 10/1998 |
| WO | WO 99/49615 | 9/1999 |
| WO | WO 01/63528 | 8/2001 |

OTHER PUBLICATIONS

European Search Report dated May 19, 2003 (EP 01 96 4447).
"National Semiconductor and EPR Partner for Information Metering/Data Security Cards" Mar. 4, 1994, Press Release from Electronic Publishing Resources, Inc.
Weber, R., "Digital Rights Management Technology" Oct. 1995.
Flasche, U. et al., "Decentralized Processing of Documents", pp. 119-131, 1986, Comput. & Graphics, vol. 10, No. 2.
Mori, R. et al., "Superdistribution: The Concept and the Architecture", pp. 1133-1146, 1990, The Transactions of the IEICE, vol. E 73, No. 7, Tokyo, JP.
Weber, R., "Metering Technologies for Digital Intellectual Property", pp. 1-29, Oct. 1994, A Report to the International Federation of Reproduction Rights Organizations.
Clark, P.C. et al., "Bits: A Smartcard protected Operating System", pp. 66-70 and 94, Nov. 1994, Communications of the ACM, vol. 37, No. 11.
Ross, P.E., "Data Guard", pp. 101, Jun. 6, 1994, Forbes.
Saigh, W.K., "Knowledge is Sacred", 1992, Video Pocket/Page Reader Systems, Ltd.
Kahn, R.E., "Deposit, Registration and Recordation in an Electronic Copyright Management System", pp. 1-19, Aug. 1992, Corporation for National Research Initiatives, Virginia.
Hilts, P. et al., "Books While U Wait", pp. 48-50, Jan. 3, 1994, Publishers Weekly.
Strattner, A, "Cash Register on a Chip may Revolutionize Software Pricing and Distribution: Wave Systems Corp.", pp. 62, Apr. 1994, Computer Shopper, vol. 14, No. 4, ISSN 0886-0556.
O'Conner, M., "New Distribution Option for Electronic Publishers; iOpener Data Encryption and Metering System for CD-ROM use; Column", pp. 134, Mar. 1994, CD-ROM Professional, vol. 7, No. 2, ISSN: 1409-0833.

Willett, S., "Metered PCs: Is Your System Watching You? Wave Systems beta tests new technology", pp. 84, May 2, 1994, InfoWorld.
Linn, R., "Copyright and Information Services in the Context of the National Research and Education Network", pp. 9-20, Jan. 1994, IMA Intellectual Property Project Proceedings, vol. 1, Issue 1.
Perrit, Jr., "Permission Headers and Contract Law", pp. 27-48, Jan. 1994, IMA Intellectual Property Project Proceedings, vol. 1, Issue 1.
Upthegrove, L., "Intellectual Property Header Descriptors: A Dynamic Approach", pp. 63-66, Jan. 1994, IMA Intellectual Property Proceedings, vol. 1, Issue. 1.
Sirbu, M., "Internet Billing Service Design and prototype Implementation", pp. 67-80, Jan. 1994, IMA Intellectual Property Project Proceedings, vol. 1, Issue 1.
Simmel, S. et al., "Metering and Licensing of Resources: Kala's General Purpose Approach", pp. 81-110, Jan. 1994, IMA Intellectual Property Project Proceedings, vol. 1, Issue 1.
Kahn, R., "Deposit, Registration and Recordation in an Electronic Copyright Management System", pp. 111-120, Jan. 1994, IMA Intellectual Property Project Proceedings, vol. 1, Issue 1.
Tygar, J. et al., "Dyad: A System for Using Physically Secure Coprocessors", pp. 121-152, Jan. 1994, IMA Intellectual Property Project Proceedings, vol. 1, Issue 1.
Griswold, G., "A Method for Protecting Copyright on Networks", pp. 169-178, Jan. 1994, IMA Intellectual Property Project Proceedings, vol. 1, Issue 1.
Nelson, T., "A Publishing and Royalty Model for Networked Documents", pp. 257-259, Jan. 1994, IMA Intellectual Property Project Proceedings, vol. 1, Issue 1.
Robinson, E., "Redefining Mobile Computing", pp. 238-240, 247-248 and 252, Jul. 1993, PC Computing.
Abadi, M. et al., "Authentication and Delegation with Smart-cards", 1990, Research Report DEC Systems Research Center.
Mark Stefik, "Letting Loose the Light: Igniting Commerce in Electronic Publication", pp. 219-253, 1996, Internet Dreams:P Archetypes, Myths, and Metaphors, IDSN 0-262-19737-6.
Mark Stefik, "Letting Loose the Light: Igniting Commerce in Electronic Publication", pp. 2-35, Feb. 8, 1995, Internet Dreams: Archetypes, Myths and Metaphors.
Henry H. Perritt, Jr., "Technological Strategies for Protecting Intellectual Property in the Networked Multmedia Enviroment", Apr. 2-3, 1993, Knowbots, Permissions Headers & Contract Law.

* cited by examiner

| |
|---|
| Integrity profile identification |
| Version number of integrity profile |
| Creation date |
| Creator |
| Content Provider Name and ID |
| A list of integrity values (e.g., hash values) of the components |
| (optional) Interaction relationship among the components |
| Digital signature of integrity profile |
FIG. 4
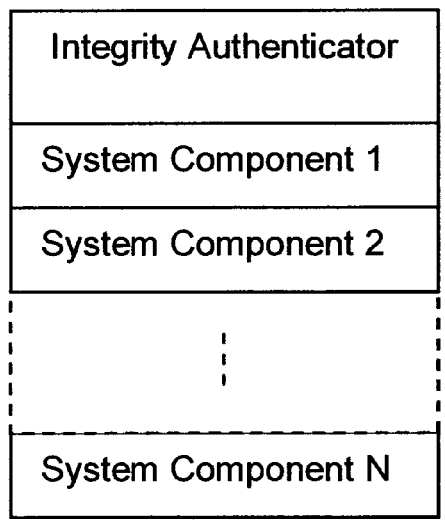
FIG. 5
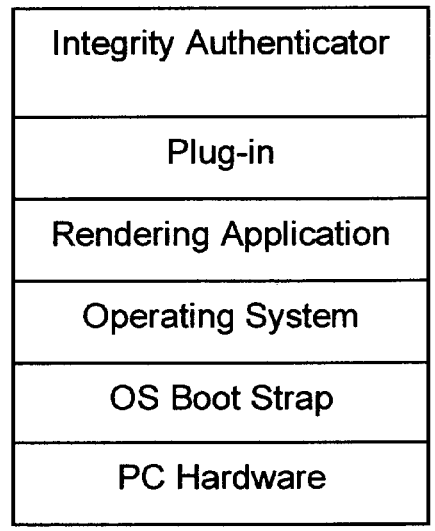
FIG. 6

SYSTEMS AND METHODS FOR INTEGRITY CERTIFICATION AND VERIFICATION OF CONTENT CONSUMPTION ENVIRONMENTS

BACKGROUND OF THE INVENTION

1. Field of the Invention

This invention relates to integrity certification and verification. In particular, this invention relates to integrity certification and verification within a content consumption environment.

2. Description of the Related Art

One of the most important issues impeding the widespread distribution of digital documents via electronic commerce is the current lack of protection available for the intellectual property rights of content owners and providers during the distribution and use of those digital documents. Efforts to resolve this problem have been termed Intellectual Property Rights Management (IPRM), Digital Property Rights Management (DPRM), Intellectual Property Management (IPM), Digital Rights Management (DRM), Rights Management (RM) and Electronic Copyright Management (ECM).

Content providers often want their contents to be consumed by certified applications and systems that have a desired characteristic and/or behavior. The direct use of a public key infrastructure (PKI) makes it possible that application and system providers can certify their own products and content providers can verify the integrity of the applications and systems that are used to consume their contents.

SUMMARY OF THE INVENTION

However, the direct use of the PKI creates a many-to-many relationship between the vendors and the providers. This type of relationship does not scale well, and hence, managing the relationship and conducting an efficient and real-time integrity verification is difficult, if not impossible, to achieve.

Content providers often want to have their contents consumed by certified applications and systems that have desired characteristics and behaviors. By controlling these aspects of the content consumption environment, the content provider can, for example, restrict usage, e.g., copying, printing, embedding, distribution, or the like.

For example, a content provider may want to protect content against misuse by demanding that the system that consumes the content be of a certain level of security and rights management capability. The content provider may also want to assure that no "alien" application, e.g., a debugger, virus, interception routine, or the like, interacts with the content consumption application on the user system which may confiscate or otherwise "steal" the content or other sensitive information. For example Application Ser. No. 60/261,803, entitled "Document Distribution Management Method And Apparatus Using A Standard Rendering Engine And A Method And Apparatus For Controlling A Standard Rendering Engine," filed herewith and incorporated herein by reference in its entirety, allows the management of the functionality of a user system to restrict a user's access to and over a document.

In order to certify that given applications and systems have desired characteristics and behaviors, a verification of all the applications and system components needed to consume the content need be confirmed by a verification application.

This invention describes systems and methods that provide certification and verification services to content consumption environments. Within such a system, an integrity certification and verification device that provides these services is introduced between a content provider and a content consumption system/application provider. This certification device registers individual applications and/or systems from their respective providers, and certifies the integrity of these applications and/or systems to content providers according to a predetermined selection. Through the use of this service, a content provider can "trust" an integrity certification and verification device. With this trust, the provider establishes a profile of a set of applications and systems that are allowed to consume its contents, and verifies on the user system(s), according to the profile, that the user's set of applications and systems are authentic.

In particular, the systems and methods of this invention provide certification and verification services to integrity of content, e.g., a document, consumption environments. Within such a system, an integrity certification and verification device that provides these services is introduced between content providers and content consumption system and application providers who may distribute, for example, personal computers, handheld computers, PDAs, multimedia display devices, DVD players, distributed network enabled phones, and applications, such as word processors, document viewers, multimedia players, or the like. The integrity certification and verification device registers individual applications and/or systems from the content consumption system/application providers, and certifies sets of these applications and systems to content providers. By using this service, a content provider can select, or trust, the integrity certification and verification device, establish a profile of a set of applications and systems that are allowed to consume its contents, and verify on a user system, according to the profile, that the set of applications and systems on the user system are authentic. In this manner, the extent of access to, or control over, the content requested, or submitted, by the user can be controlled.

A document, as the term is used herein, is any unit of information subject to distribution or transfer, including, but not limited to, correspondence, books, magazines, journals, newspapers, other papers, software, a plug-in, photographs and other images, audio and video clips and other multimedia presentations. A document may be embodied in printed form on paper, as digital data on a storage medium, or in any other known or later developed variety of media or software including, for example, compact discs (CD's), digital video discs (DVD), laser discs, magneto- and magneto-optic media and the like.

The systems and methods of this invention provide for integrity certification and verification services.

This invention separately provides systems and methods for integrity certification and verification services for content consumption system environments.

This invention also separately provides a system and method for determining an integrity profile.

This invention additionally provides a system and method for verifying the integrity of one or more system environments.

This invention also provides a system and method for managing integrity profiles, system and system component information.

This invention additionally provides a system and method that performs an integrity check on a user system through the use of an integrity profile.

Specifically, the content provider, such as a document publisher or distributor, initiates a request for an integrity profile. This request for the integrity profile is forwarded to an integrity certification and verification device. The integrity certification and verification device can, for example, if an integrity profile does not already exist for the requested applications and systems components, query a content consumption system/application provider, who, for example, has supplied various system components and/or applications to users. The content consumption system/application provider returns to the integrity certification and verification device authentication information about the particular applications or system components. The authentication information allows a comparison, or integrity verification, to be made between an application or system component on a user's system, and the original application or system component as distributed by the content consumption system/application provider.

The authentication information for system applications and components are stored in a component database. The profiles for content providers are stored in a profile database. Alternatively, the content consumption system/application provider can maintain a database of authentication information that can be forwarded directly to the respective database of the integrity certification and verification device, without the need for the integrity verification and certification device determining the integrity profile. An integrity profile identification, corresponding to the determined integrity profile, is then returned to the content provider.

A content provider, such as a document distributor, provides, for example, protected content to a user. The content provider forwards to the user a protected version of the digital content that includes, for example, a license agreement and an integrity profile identification. The integrity profile identification includes, for example, the applications and system components that are allowed to be used in conjunction with the protected content, and the identification of the integrity profile for those systems/applications.

Having the authentication information from the content consumption system/application provider, the integrity certification and verification device forwards, for example, at the request of the user system, an integrity profile to the user system. With this integrity profile, an integrity verification of the user's system can be performed. If it is determined that the components/applications of the user's system are authentic, the digital content provided by the content provider can then be accessed by the user's applications and systems in accordance with, for example, the additional profile information.

However, it is to be appreciated that the request for an integrity certification need not originate with the content provider. To the contrary, the certification request can be initiated, for example, by a software application embedded in the profile identification information that is forwarded with the protected content from the content provider to the user's system.

Alternatively, the content provider may also serve as the integrity verification and certification system. In this instance, the content provider conducts the integrity certification and verification service itself by gathering the appropriate authentication information and determining an integrity profile for the content provider's own use.

Additionally, the content consumption application/system provider can also act as the integrity certification and verification device. In this instance, the content consumption application/system provider, for example, may also supply an integrity profile together with the associated application and/or system component.

These and other features and advantages of this invention are described in, or are apparent from the following detailed description of the preferred embodiments.

BRIEF DESCRIPTION OF THE DRAWINGS

The preferred embodiments of the invention will be described in detail, with reference to the following figures, wherein:

FIG. 4 illustrates an exemplary structure of an integrity profile according to this invention;

FIG. 5 illustrates an exemplary environment stack according to this invention;

FIG. 6 illustrates an exemplary environment stack according to this invention;

DETAILED DESCRIPTION OF PREFERRED EMBODIMENTS

The systems and methods of this invention provide certification and verification services to determine the integrity of a content consumption environment. Within this system, an integrity certification and verification device is introduced between one or more content providers, and one or more content consumption systems and application providers. The integrity certification and verification device obtains authentication information from the content consumption application and/or system providers. This authentication information allows a content provider to trust the environment to which content will be provided. Thus, based on the authentication information received from the content consumption application and system provider, an integrity profile is established. This profile is then forwarded to the user system to confirm that the user has not altered, modified, or does not potentially interfere in a unauthorized manner with the digital content provided by the content provider.

Figure 1:
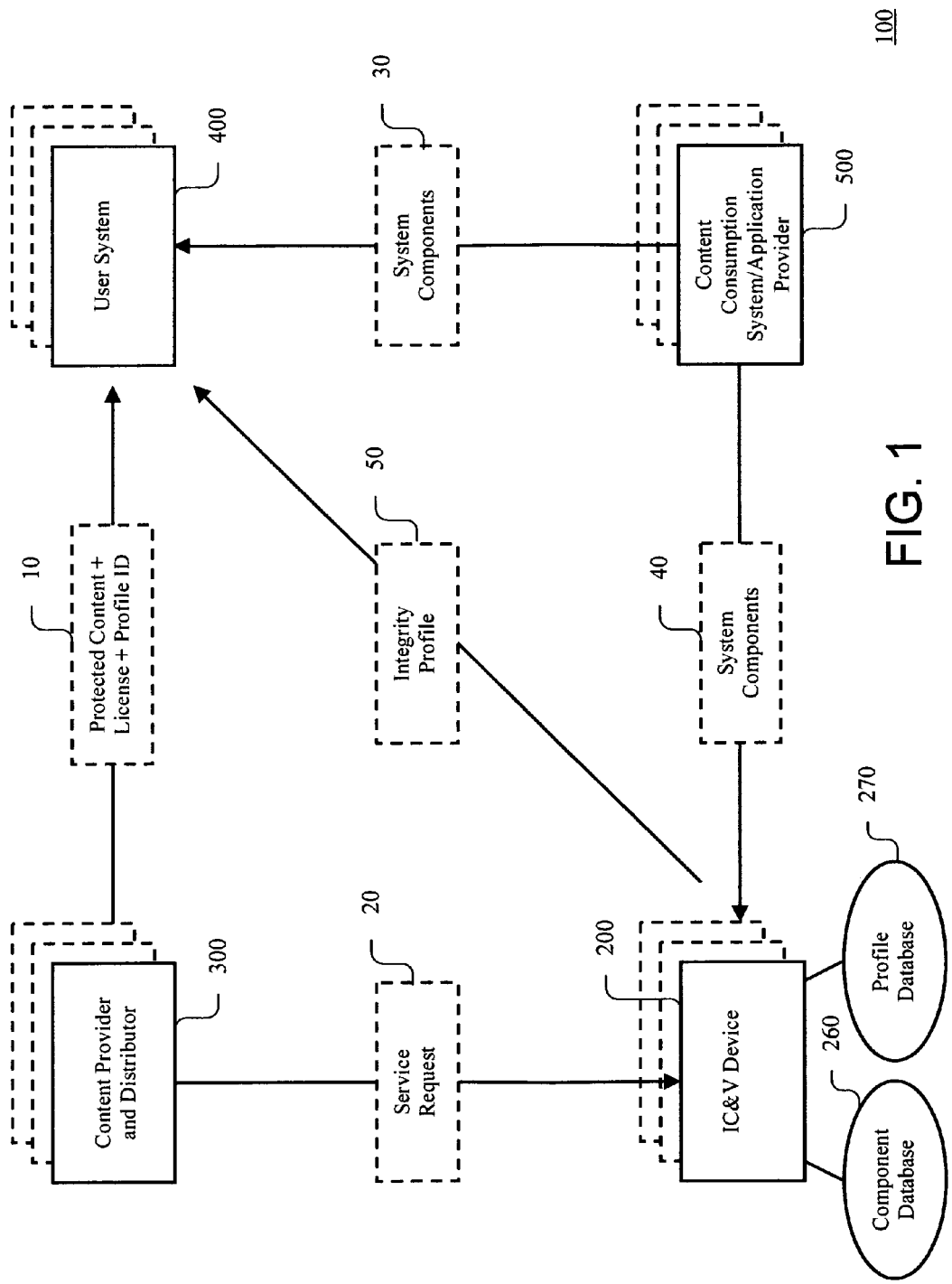
FIG. 1 is a functional overview illustrating a first exemplary embodiment of the integrity certification and verification system according to this invention.

FIG. 1 illustrates an exemplary system for performing integrity certification and verification. In particular, the integrity certification and verification system 100 includes an integrity certification and verification device 200, a content provider and/or distributor 300, a user system 400, a content consumption system/application provider 500, a component database 260 and a profile database 270.

In an exemplary operating environment, the content consumption system/application provider 500 provides applications, systems and/or software/hardware components to a user. The user system 400 allows consumption of digital content, such as documents, that are supplied by the content provider and distributor 300. In order to verify the integrity of the user system 400, the integrity certification and verification device 200 collects and registers authentication information about the individual applications, systems and/or software/hardware components from the content consumption system/application provider 500. With this authentication information, the integrity certification and verification device 200 determines and certifies an integrity profile of one or more applications, systems and/or system components based on a service request 20 from the content provider 300. This determined integrity profile 50 is then forwarded to the user system 400 so that the integrity of the user system 400 can be determined.

In operation, a content provider and distributor 300 provides digital content, such as a document, to a user system 400. The user system 400 comprises one or more system components such as hardware components and/or various software applications. These applications and hardware/software components are usually obtained by the user from one or more content consumption system/application providers, such as a computer supplier, a software warehouse, an application provider, or the like. These applications and hardware and software components are then assembled, if not already done so, or installed, as appropriate, by the user in order to allow the user to consume content, such as documents.

Thus, during the course of use of the applications and hardware/software of the user environment, the user may want to view protected content, such as a document. Thus, the user 400 would request from the content provider 300 one or more documents, such as an electronic book, a multimedia file, a presentation, a form template, or the like. Upon receiving this request, the content provider and distributor 300 could provide the requested content in protected form with a profile identification 10 to the end user 400. This profile identification 10 includes, for example, specifics as to in which applications the protected content can be viewed, and, for example, the extent to which the provided content can be manipulated within the particular software/hardware environment.

Additionally, the content provider 300 can forward a service request 20 to an integrity certification and verification device 200. The service request 20 includes, for example, a list of components and/or software applications on which the content provider 300 wishes to allow the user system 400 to consume the distributed protected content. The integrity certification and verification device 200 determines if the components and applications/software identified in the service request have corresponding authentication information stored in the component database 260 and/or the profile database 270. If the integrity certification and verification device does not have the authentication information specified in the service request 20, the integrity certification and verification device 200 can request from one or more content consumption system/application providers 500, authentication information about a particular application, system, hardware/software component, or the like. With this authentication information, the integrity certification and verification device 200 stores information pertaining to the application and system components in the component database 260. Alternatively, the integrity certification and verification device 200 can develop an integrity profile for one or more applications. With this information, which confirms the authenticity of applications, systems and system components, the integrity certification and verification device 200 forwards an integrity profile 50 to the user system 400. This integrity profile 50 is used to confirm the authenticity of systems, system components and/or applications of the user system 400. If it is determined if the user's system components and/or applications are authentic, the protected content 10 is unprotected so that the user system 400 may view or otherwise manipulate the protected content in accordance with the integrity profile.

Figure 2:
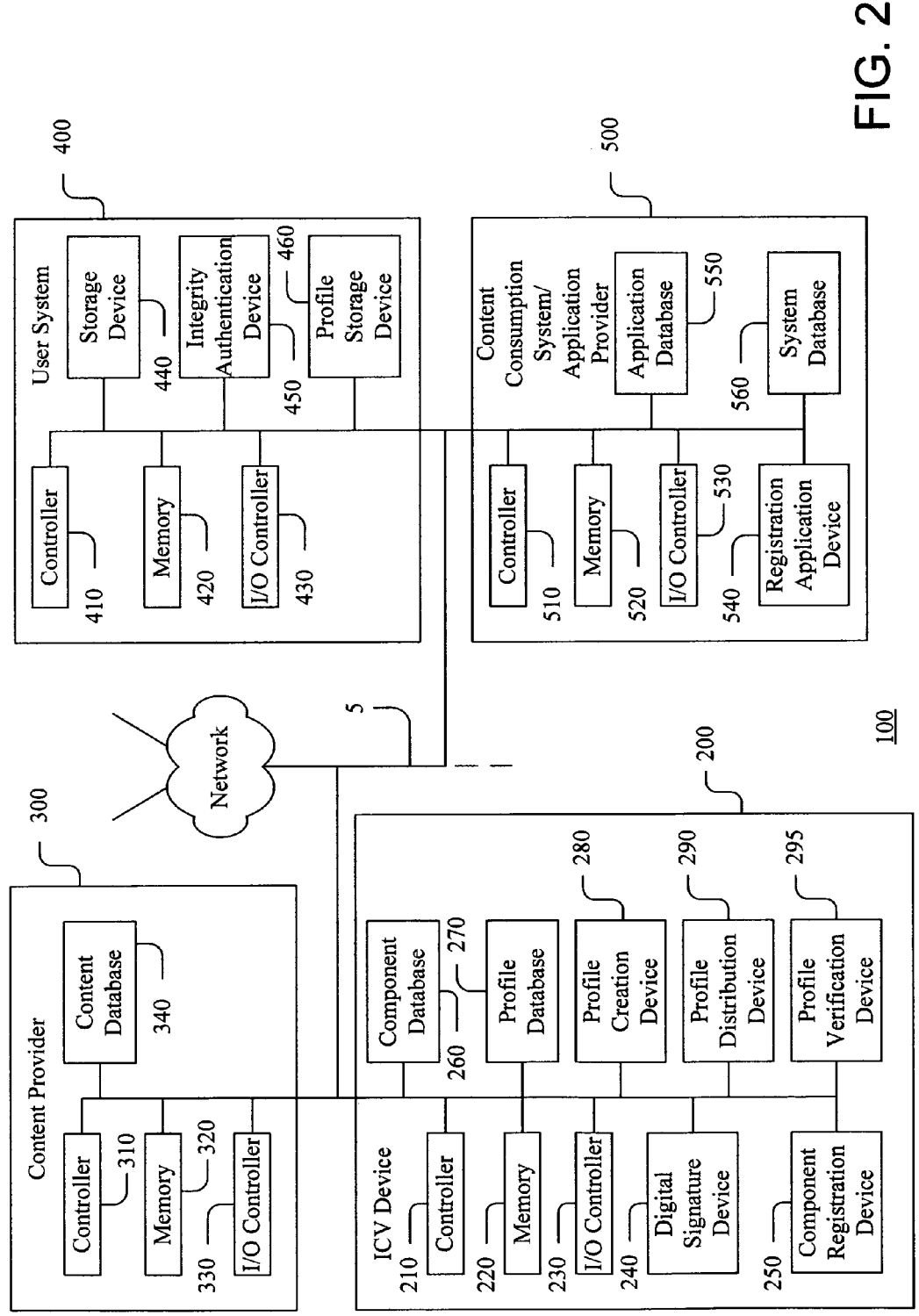
FIG. 2 is a functional block diagram illustrating a first exemplary embodiment of the integrity certification and verification system according to this invention.

FIG. 2 illustrates an overview of the components of an integrity certification and verification environment 100 according to an exemplary embodiment of this invention. In particular, the integrity certification and verification environment 100 comprises one or more content providers 300, one or more user systems 400, one or more integrity certification and verification devices 200, and one or more content consumption system/application providers 500.

The content provider 300 comprises, for example, a controller 310, a memory 320, an I/O controller 330, and a content database 340. However, it is to be appreciated that the content provider 300 may also distribute content in a more traditional manner. For example, the content provider may distribute a compact disk containing content. This compact disk, for example, could be delivered through a postal service to a user. In general, any type of distribution and dissemination process will work equally well with the systems and methods of this invention.

The integrity certification and verification device 200 comprises a controller 210, a memory 220, an I/O controller 230, a digital signature device 240, a component registration device 250, a component database 260, a profile database 270, a profile creation device 280, a profile distribution device 290 and a profile verification device 295. The integrity certification and verification device 200 provides the following services: component registration service and integrity profile service. The registration service allows registration of applications, systems, and/or software/hardware components from their respective providers as authentic ones, with intended characteristics, purposes and/or behaviors.

An integrity profile service is provided to content providers to build and retrieve integrity profiles. An integrity profile is a document, which is optionally digitally signed, that contains verifiable information and a set of registered system components that are to consume the contents of protected documents. Once the integrity profile is created, the integrity profile's identification is returned to the content provider. The content provider will include the integrity profile identification and optionally a usage license with the protected documents. When the content of the protected document is consumed and there is a need to conduct a local integrity verification of the system and environment of the user, the integrity profile can be retrieved from the integrity certification and verification device 200 to the user system.

The user system 400 comprises a controller 410, a memory 420, an I/O 275 controller 430, a storage device 440, an integrity authentication device 450, and a profile storage device 460. However, it is to be appreciated that this exemplary user system is based on a model of a computer. However, it is to be appreciated that the components of the user system may change depending on, for example, the type of content being consumed. In general, any user system that comprises portions whose integrity can be verified will work equally well with the systems and methods of this invention.

The content consumption system/application provider 500 comprises, for example, a controller 510, a memory 520, an I/O controller 530, a registration application device 540, an application database 550, and a system database 560. However, similar to the content provider 300, the content consumption system/application provider may have several different forms depending on the type of system and/or application the content consumption system/application provider supplies. For example, if the content consumption system/application provider 500 supplies a specific hardware component, the content consumption system/application provider 500 may not maintain application and system databases. Alternatively, for example, the system/device component supplier may send, for example, on a disk, authentication information directly to the integrity certification and verification device 200.

Alternatively, the content consumption system/application provider 500 may coordinate efforts with the content provider 300 to facilitate determination of an integrity profile. In general, the content consumption system/application provider can be any entity that is capable of supplying hardware or software and authentication information about the same.

While in this exemplary embodiment the content consumption system/application provider 500 is shown comprising various system components, it is to be appreciated that the content consumption system/application provider 500 could be, for example, a computer distributor, a software developer, a software provider, a software distributor, or the like. Thus, the content consumption system/application provider 500 is capable of supplying devices and/or software that allows for the consumption of content that is provided by the content provider 300.

The various components of the integrity certification and verification environment 100 are capable of communication therebetween, via link 5, which can be a wired or wireless link, or any other known or later-developed element(s) that is capable of supplying electronic data to and from the connected elements. For example, the link 5 can be one or more distributed networks which may in turn be connected to one or more additional integrity certification and verification environments 100, or, alternatively, multiple instances of any one or more of the content providers 300, user systems 400, content consumption system/application providers 500 and integrity certification and verification devices 200.

In an exemplary operating environment, the content consumption system/application provider 500 supplies applications, software and/or hardware to a user. These applications, software and/or hardware are used by a user to consume content, for example, viewing documents.

The content provider 300, for example, at the request of a user located at the user system 400, distributes content, such as a document, to the user system 400. In particular, a request can be received by the content provider 300 from the user system 400. This request, which is received through the I/O controller 330, is processed by the controller 310, in cooperation with memory 320 to retrieve the requested content from the content database 340. For example, the content provider 300 can be an on-line content provider, a book store, a software provider, or any other content provider that wishes to provide content, such as a document, to a user.

Upon receiving a content request from the user system 400, the content provider 300 returns to the user system the requested content as well as additional information about the protected content. This additional information can include a profile identification. Alternatively, the additional information could contain, for example, information instructing the user system to request a profile, and hence an integrity certification, before enabling of the content.

Additionally, the additional information can identify which system components and/or hardware/software can be running and/or used on the user's machine when viewing or interacting with the requested content.

Thus, one or more of the requested content, additional information and profile identification are received by the user system 400, via the I/O controller 430, and at the direction of controller 410, stored in one or more of the memory 420 and the storage device 440.

In one exemplary embodiment, the content provider 300 can initiate a service 25 request 20, such as a request for an integrity profile, from the integrity certification and verification device 260. The integrity certification and verification device 260, receives, via the I/O controller 230, and in cooperation with the controller 210 and memory 220 the service request from the content provider 300.

As previously discussed, the integrity certification and verification device 200 comprises a component database 260 and a profile database 270. The component database 260 stores authentication information pertaining to systems and system components that can be distributed by one or more content consumption system/application providers 500. Similarly, the profile database 270 stores verifiable information and a of registered system components that e to consume the contents of protected documents for one or more individual content providers 300.

Thus, upon receipt of the request for an integrity profile from the content provider 300, the integrity certification and verification device 200, at the direction of the controller 210 and with the aid of memory 220, searches the component database 260 and the profile database 270 to determine if authentication information already exists that corresponds to the information in the service request.

Alternatively, the integrity certification and verification device 200 can perform an on-line verification service. The on-line verification service is provided to perform the integrity verification on-line, for example, at real time within the integrity certification and verification device 200. In order to initiate this service, a piece of software, called an integrity authenticator, is forwarded to the user system 400. The integrity authenticator allows the collection of information of local software and/or hardware components. Alternatively, the integrity authenticator can be a dedicated device, such as the integrity authentication device 450 illustrated in FIG. 2. The information gathered about the local software and/or hardware components is returned along with the integrity profile identification to the integrity certification and verification device 200 so that the on-line integrity verification can be performed. The component registration device 250 examines software/hardware components from their respective providers and stores identification information in the component database 260. The information pertaining to the software/hardware component can be, for example, hashed and the hash value can be used as the authentic software/hardware identification. However, it is to be appreciated that the information to identify each software/hardware component can be any known or later-developed scheme that allows for identification of an authentic piece of hardware and/or software.

The registration of a particular software and/or hardware component is accomplished as follows. For example, the content consumption system/application provider 500 can communicate with the identification and certification verification device 200 to request a registration service or, alternatively, the identification and certification verification device 200 can communicate with content consumption system/application provider 500 in order to secure the authentication information. In this example, the registration application device 540, in cooperation with the controller 510, the memory 520 and the I/O controller 530, searches one or more of the application database 550 and the system database 560 to secure information about the particular software and/or hardware including, for example, the provider name, a component identification, for example, a serial number, version number, build number, or the like, and alternatively, the application itself.

For example, in one particular operating scenario, instead of acquiring authentication information from a particular content consumption system/application provider 500, the integrity certification and verification device 200 could actually request, for example, a particular application, such as a software program, from the content consumption system/application provider 500. In this way, the integrity certification and verification device 200 would not need authentication information since the integrity certification and verification device 200 could secure the particular software application directly from the content consumption system/application provider 500.

The component registration device 250 verifies the information of the component, and optionally computes, for example, a hash value that can be used, for example, as the authentic software and/or hardware identification. The component registration device 250 then stores the component information and, for example, the hash value, in the component database 260.

Alternatively, instead of sending the software and/or hardware component to the registration application device 540, the content consumption system/application provider 500 can also connect to the component registration device 250 to download a small software application, such as a registration application, and have it executed locally. This registration application will examine the target software/hardware component and send information pertaining to this software/hardware component possibly along with an integrity value, such as a hash value, back to the component registration device 250 which can then store the authentication information about the component in the component database 260.

Alternatively, the profile creation device 280 builds integrity profiles for software. In particular, an integrity value, such as a hash value, of each software application can be retrieved from the component database and stored. Also included in the profile is an optional interaction relationship among the components. This relationship is used to identify the calling and returning sequence of the components in order to prevent unintended interaction with other components. The content of the integrity profile is then, for example, digitally signed and the resulting signature is appended to the integrity profile. Each integrity profile is associated with a unique identification.

Figure 3:
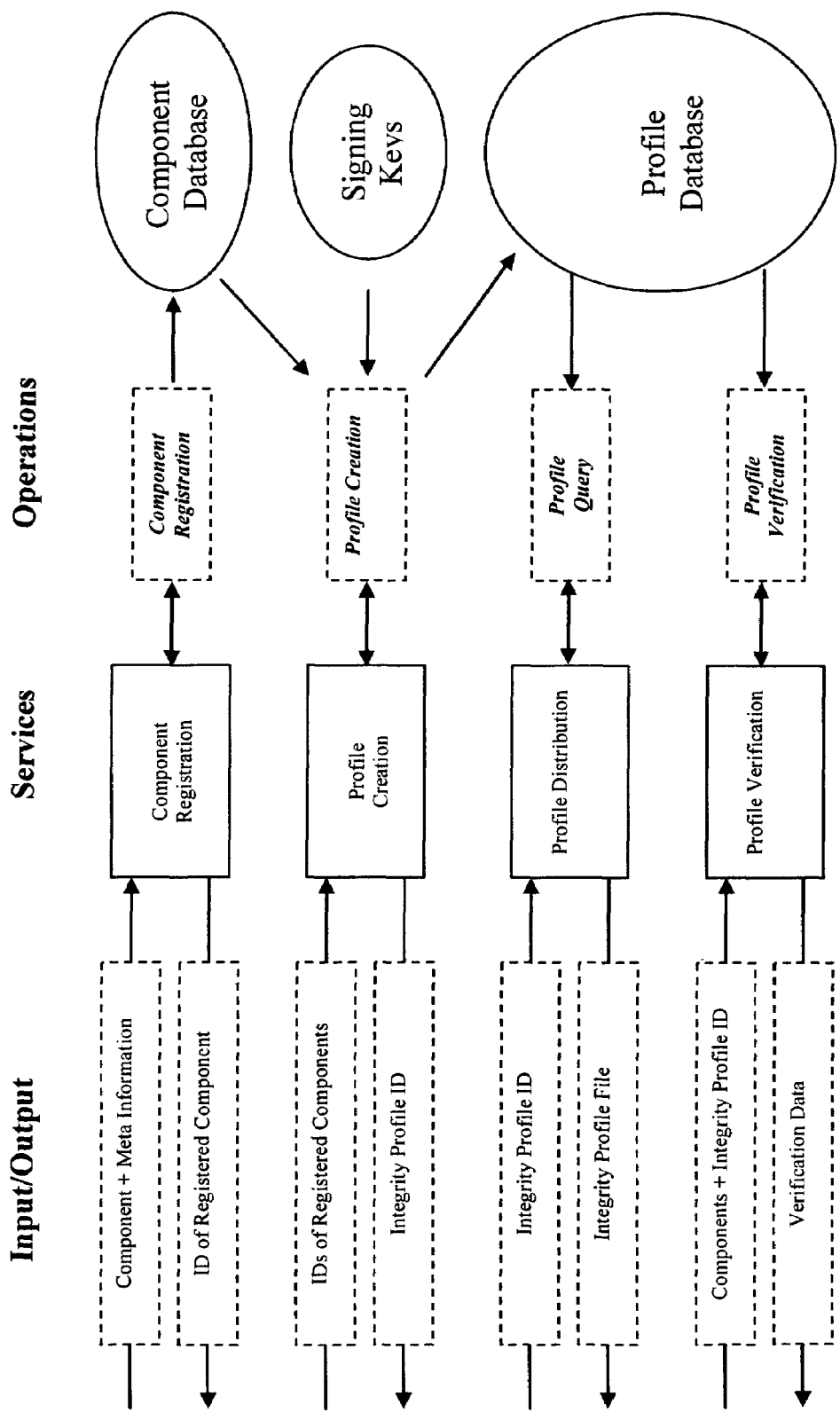
FIG. 3 is a workflow diagram of an exemplary integrity certification and verification device according to this invention.

FIG. 3 illustrates an exemplary workflow of input, output and services and operations provided by the integrity certification and verification device 200. Specifically, for the component registration service, a component identification, and optionally, meta information about the particular component, is forwarded to the component registration device 250. The component registration device 250 registers the component, for example, with intended characteristics, purposes, and behaviors in the component database. Then, the component registration device 250 returns the identification of the registered component to, for example, the content consumption system/application provider, and makes the identification available to, for example, the content provider 300.

For profile creation, the profile creation device 280 receives the identifications of registered components. The identifications of the registered components, when combined with the information about the associated components, if any, are then digitally signed and stored in the profile database. An integrity profile identification is returned to the requestor.

Similarly, the profile distribution device 290 receives an integrity profile identification. The profile database 270 is then queried to determine if an integrity profile corresponding to the integrity profile identification is available. If the integrity profile is available, the integrity profile is returned to the requestor. Otherwise, the integrity profile can be determined with the aid of the profile creation device 280.

The profile verification device 295 receives information identifying one or more components and an integrity profile identification. The profile verification device compares the component identifications, integrity profile identification and corresponding integrity profile to determine verification data. If the profiles and components and identifications match, the integrity of the system has been verified. Otherwise, the system is not the one specified in the integrity profile, or it has been altered in some way.

FIG. 4 illustrates an exemplary integrity profile. This exemplary integrity profile can be created by the profile creation device 280. To build an integrity profile for an authenticated content provider, a request for creating integrity profile is initiated. For example, the provider can contact the integrity certification and verification device 200 and request the creation of an integrity profile. Then, the provider sends a list of names of software and/or hardware components to the integrity certification and verification device 200. The profile creation device 280 then retrieves the identification, such as an integrity or a hash value, of each of the components from the component database 260. The profile creation device 280 then determines an integrity profile, which contains the authentication information, such as an integrity or a hash value, of each of the components, together with other information such as the integrity profile identification, version number, creation date, build date, content provider name, and for example, optionally, the interaction relationship between any of the software and/or hardware components.

The profile creation device 280 forwards the determined integrity profile to a digital signer 240, which can then sign the content of the profile. The profile creation device 280 then stores the signed profile in the profile database 270 and returns the profile identification to the content provider 300.

When creating, for example, a usage license for the content of a protected document, the content provider 300 can optionally include the integrity profile identification into the usage license. On the user system 400, the integrity profile will be used to verify all of the software/hardware components in an environment call stack. This assures that the sensitive information can only be consumed by authorized software/hardware components, or any combination thereof.

The profile distribution device 290 accepts requests for obtaining integrity profiles and retrieves them from the profile database 270 and returns the integrity profiles to the respective requester. Similarly, the profile verification device 295 accepts requests for verifying user systems for one or more system environments. The profile verification device 295 gathers the information about the software/hardware components according to integrity profiles, verifies the information against the profiles, and returns the verification results back to the requesters.

The user system 400 comprises an integrity authentication device 450. The integrity authentication device 450, for example, runs on top of any content consumption application.

Thus, FIG. 5 illustrates an exemplary system environment stack on user device 400 for verifying system integrity. In particular, the user system environment stack comprises an integrity authenticator and one or more system components.

FIG. 6 illustrates an example of an environment stack which includes an integrity authenticator, a plug-in, a rendering application, an operating system, an operating system (OS) boot strap, and the respective hardware.

In an exemplary operating environment, the integrity authentication device 450 contains its own encryption/decryption key pair and a verification key of an identification certification and verification device. These keys are possibly hidden and/or embedded within the integrity authentication device 400 for the tamper-resistance aspects of this invention. For those applications that require the use of a user's private information or involve sensitive documents and data, the integrity authentication device 450 can use an associated integrity profile to verify all of the software/hardware components on the call stack in the user system environment.

Figure 7:
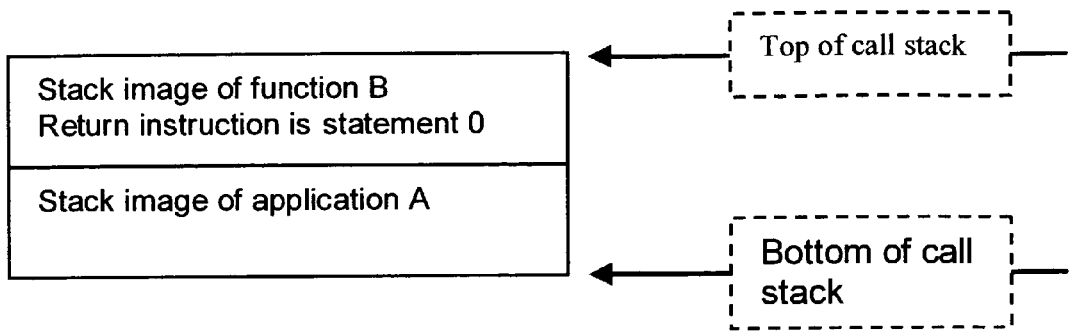
FIG. 7 illustrates the workflow of an exemplary stack according to this invention.
Figure 8:
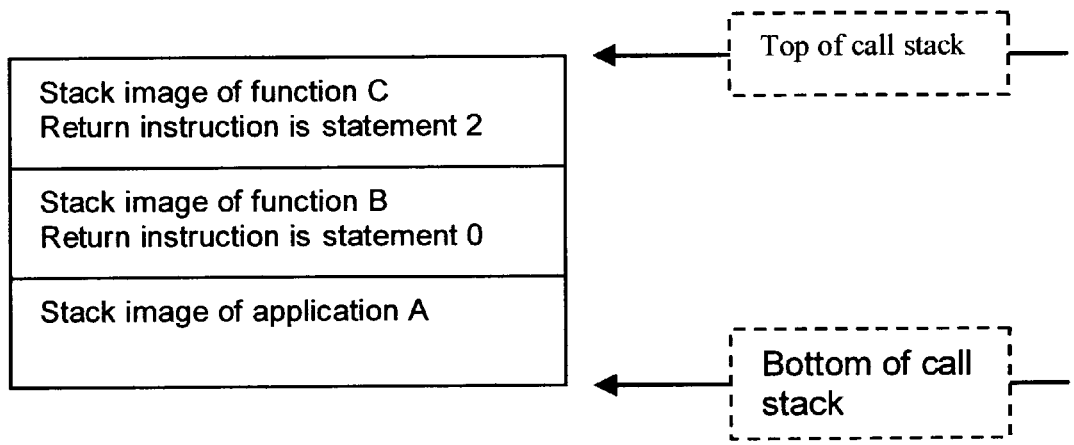
FIG. 8 illustrates an exemplary workflow of the stack according to this invention.
Figure 9:
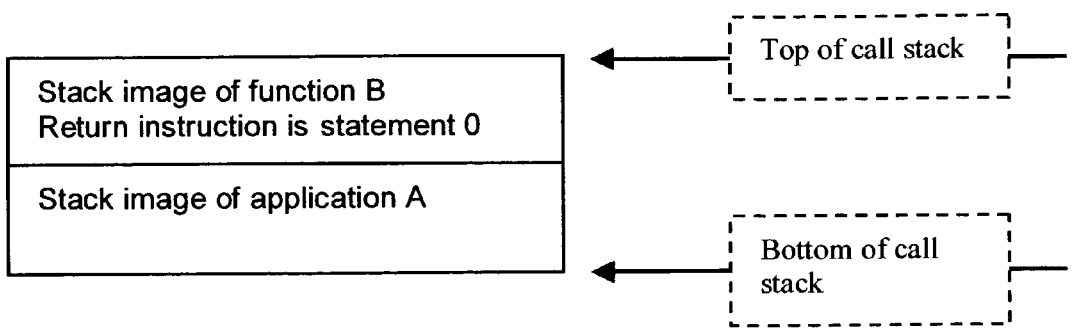
FIG. 9 illustrates an exemplary method of manipulating the stack according to this invention.

The integrity authentication device 450 will first verify the signature of the profile using the integrity certification and verification device verification key. As illustrated in FIGS. 7–9, once the signature is verified, the integrity authentication device 450 examines the current call stack and starts to authenticate each software/hardware component on the call stack using the information provided in the integrity profile. The call stack is a continuous block of memory which consists of memory images and the involved functions or procedures. The stack operates on the concept of a last-in-first-out and the stacks basic operations are the stack "push" and stack "pop." Push is used to store the images onto the stack and advance to the top of the stack to a position. Pop is used to remove the data from the stack and restore the top of the stack to a previous position.

With the call stack, the image of the currently executed function is at the top of the stack. When the currently executed function invokes or calls the next function, the memory image of the next function is pushed on the top of the call stack and the top of the call stack points to the image of the next function. Each portion of the stacked images will contain the addresses or return instruction after the called function finishes its execution.

Figure 10:
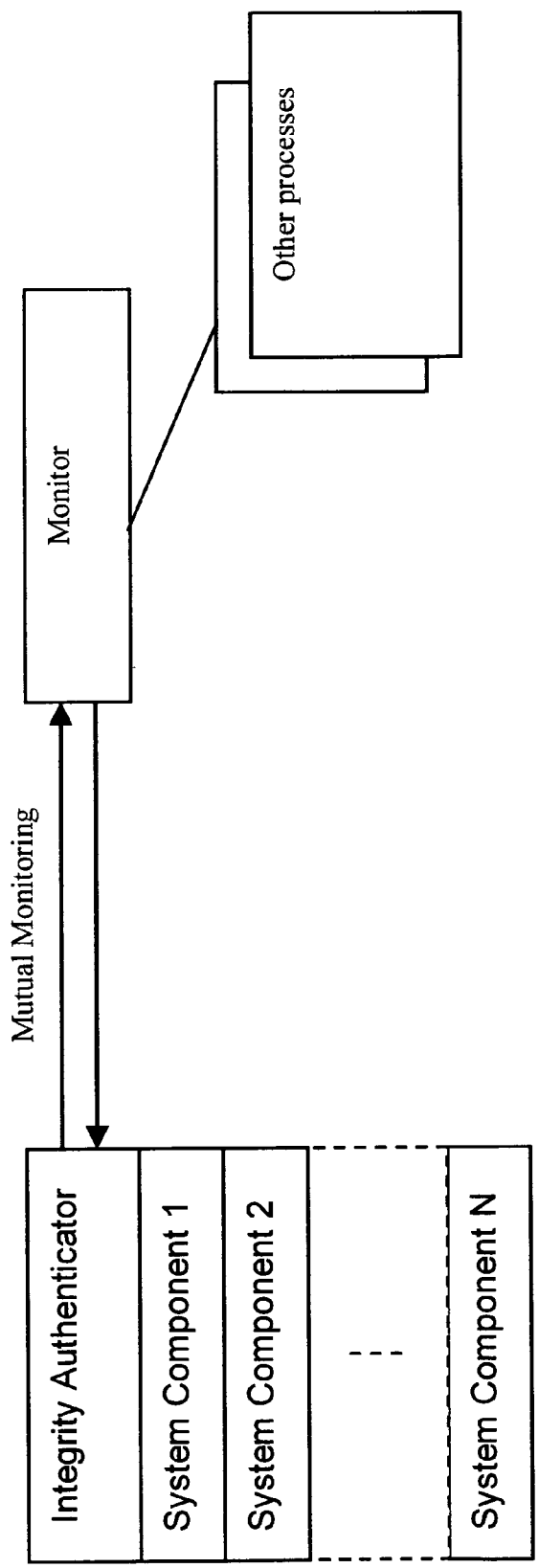
FIG. 10 illustrates an exemplary method of preventing dynamic tampering through the use of debugging according to this invention.

FIG. 10 illustrates how the execution environment is protected. Specifically, to protect the Integrity Authenticator (IA), the execution of the IA is monitored by a trusted application, which is part of the IA. The monitoring process, e.g., an application, can be a bugger or a special process that can prevent the IA from being monitored by any other process or application in the system. In an environment when a process can only be debugged by only one process, then the trusted monitoring program can be implemented as a debugger. Since the monitoring program is a trusted application, the monitoring program's integrity must be in the current integrity profile. Therefore, the IA will verify the integrity of the trusted application before loading and execution. The function of the trusted monitoring application is to prevent the IA from being monitored and controlled and captured by other processes. Another function of the trusted monitoring application is to monitor the current environment and determine if the change in environment is valid. However like the IA, the trusted monitoring application must also be protected and the IA will act as the monitor to protect the trusted monitoring application from being monitored, captured and/or controlled by other applications. This dual protection mechanism creates a closed system that will prevent other applications from monitoring the execution of the integrity authenticator.

Figure 11:
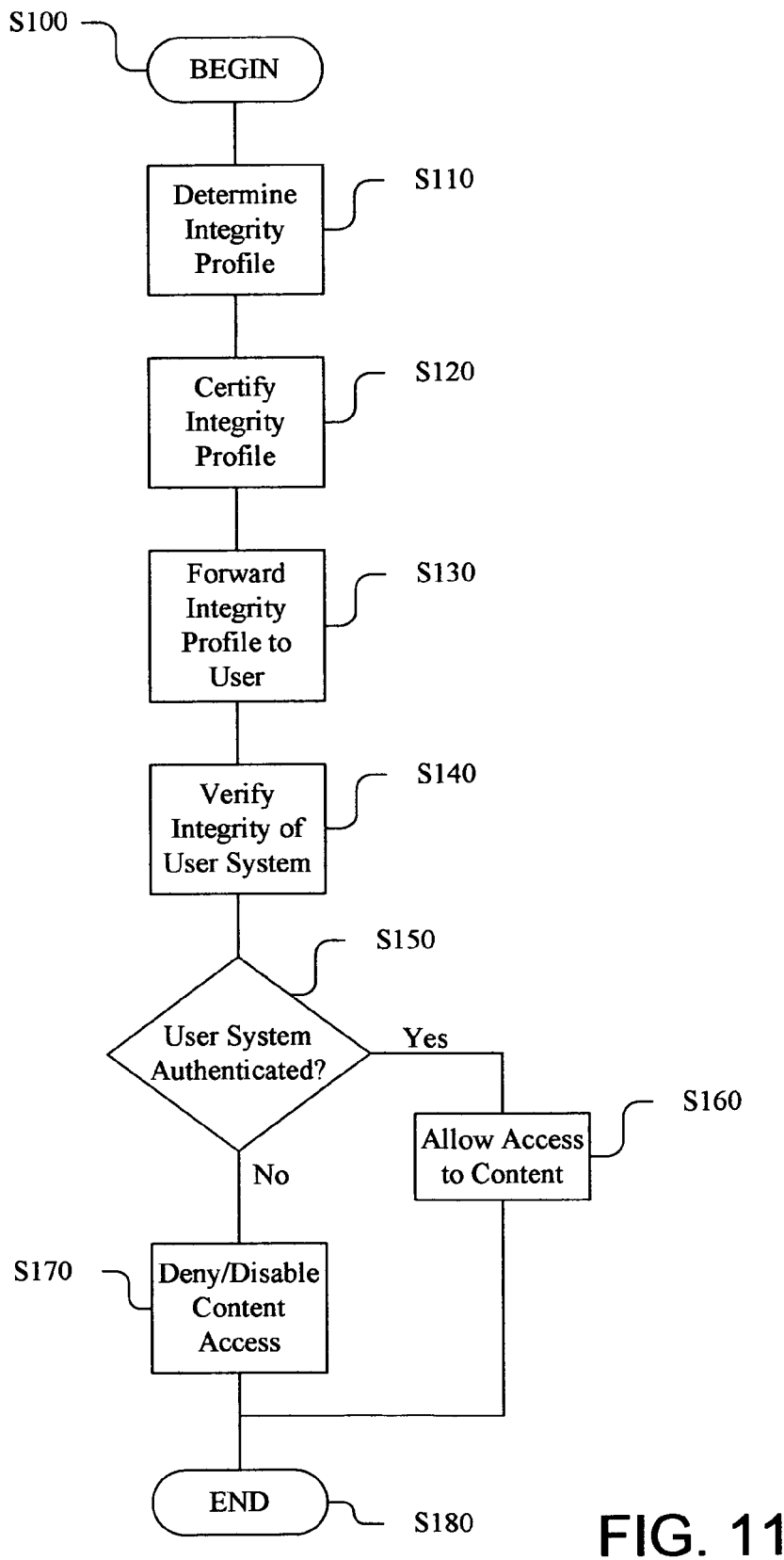
FIG. 11 is a flowchart outlining one exemplary embodiment of a method for integrity certification and verification according to this invention.

FIG. 11 illustrates an exemplary method of operation of the integrity certification and verification device. In particular, control begins in step S100 and continues to step S10. In step S110, an integrity profile is determined. Next, in step S120, the integrity profile is certified. Then, in step S130, the integrity profile is forwarded to the user. Control then continues to step S140.

In step S140, the integrity of the user system is verified. Next, in step S150, a determination is made whether the user system is authentic. If the user system is authentic, control continues to step S160, where the user is allowed access to the selected content. Otherwise, control jumps to step S170, where the content access is denied or disabled. Control then continues to step S180, where the control sequence ends.

Figure 12:
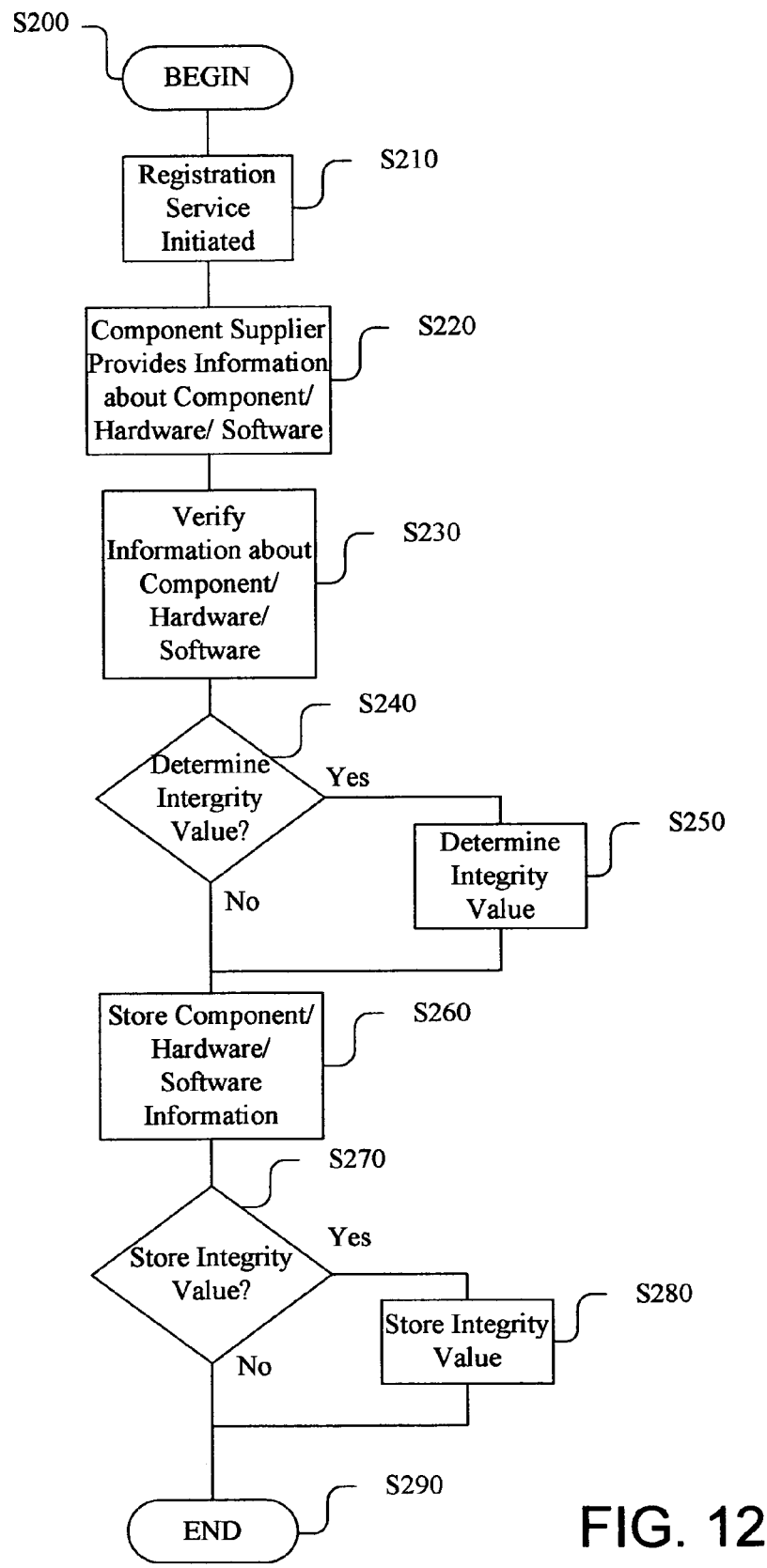
FIG. 12 is a flowchart outlining one exemplary embodiment of a method for registering applications and/or systems according to this invention.

FIG. 12 illustrates an exemplary method of registering components/hardware and/or software according to this invention. In particular, control begins in step S200 and continues to step S210. In step S210, the registration service is initiated. Next, in step S220, the component supplier provides authentication information about particular components/hardware and/or software. Then, in step S230, information about the particular components/hardware and/or software is verified. Control then continues to step S240.

In step S240 determination whether an integrity value should be determined. If an integrity value is to be determined, control continues to step S250, where an integrity value is determined. Otherwise, control jumps to step S260 where authentication information about the component/hardware and/or software is stored. Next, in step S270, a determination is made whether to store an integrity value. If an integrity value is to be stored, control continues to step S280, where the integrity value is stored. Otherwise, if an integrity value is not to be stored, control jumps to step S290, where the control sequence ends.

Figure 13:
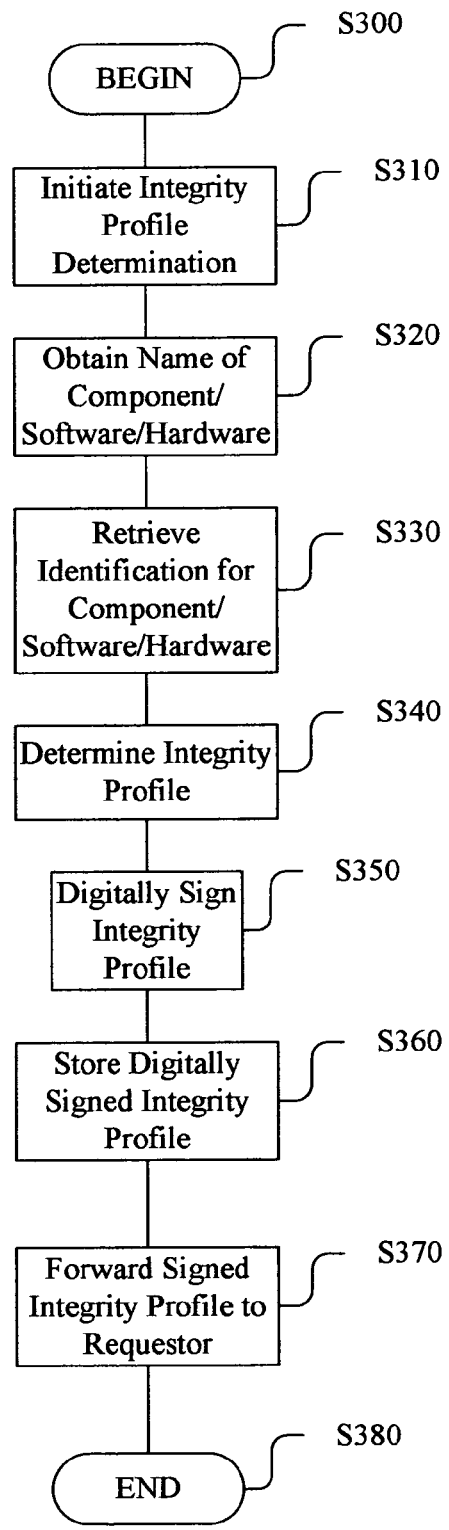
FIG. 13 is a flowchart outlining an exemplary embodiment of a method for determining an integrity profile according to this invention.

FIG. 13 illustrates an exemplary method of determining a profile according to this invention. In particular, control begins in step S300 and continues to step S310. In step S310, the integrity profile determination is initiated. Next, in step S320, the name, such as an identification of the component and/or hardware or software is obtained. Then, in step S330, the identification for the component/hardware or software is retrieved. Control then continues to step S340.

In step S340, the integrity profile is determined. Next, in step S350, the integrity profile is digitally signed. Then, in step S360, the digitally signed integrity profile is stored. Control then continues to step S370.

In step S370, the signed integrity profile is then forwarded to the requestor, such as the content consumption system/ application provider. Control then continues to step S380 where the control sequence ends.

Figure 14:
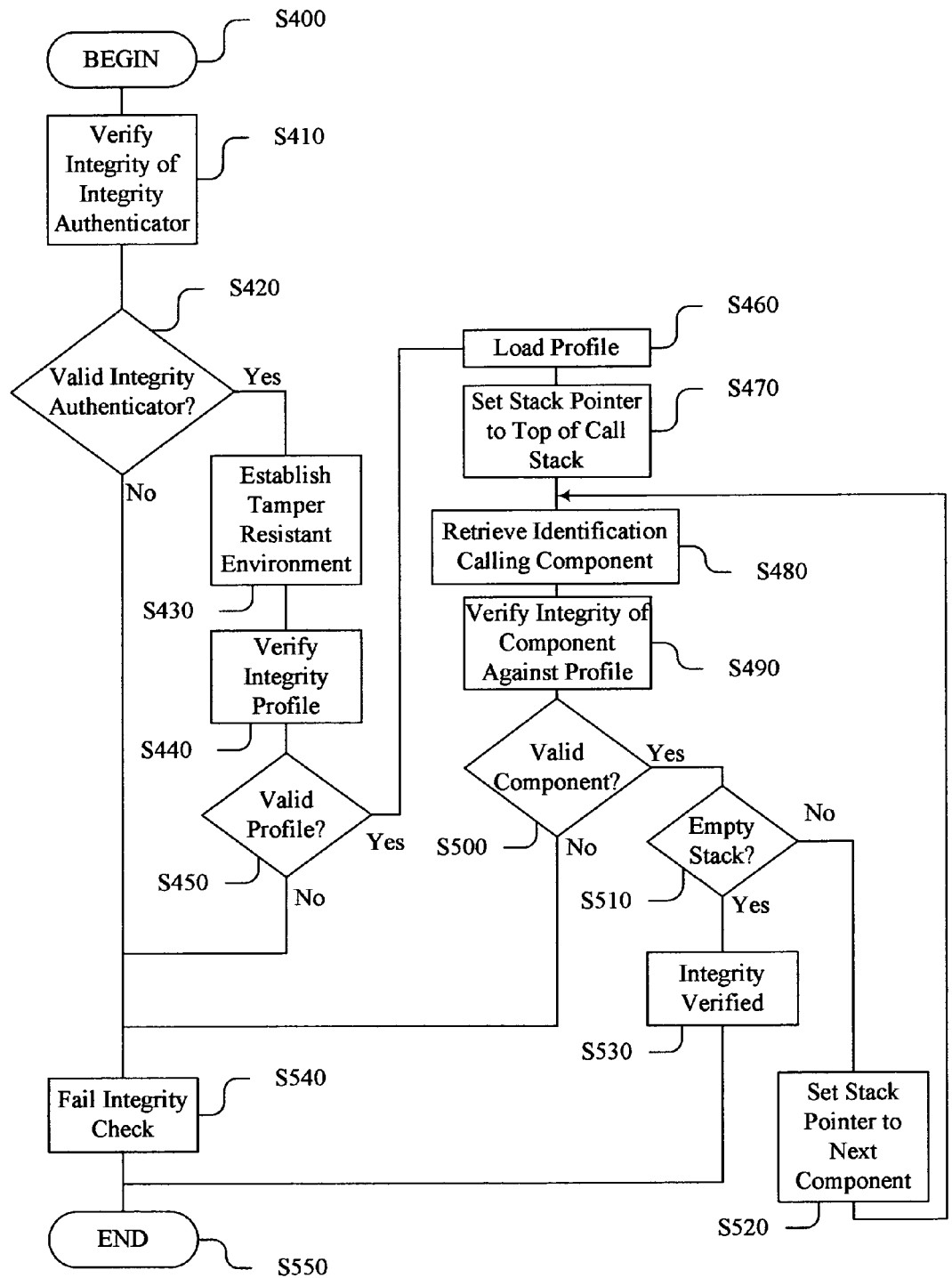
FIG. 14 is a flowchart outlining an exemplary embodiment of a method for verifying the integrity of an integrity authenticator according to this invention.

FIG. 14 illustrates an exemplary method of verifying the integrity of the integrity authenticator in accordance with one aspect of the present invention. Control begins in step S400 and continues to step S410. In step S410, the integrity of the integrity authenticator is verified. Next, in step S420, a determination is made whether the integrity authenticator is valid. If the integrity authenticator is valid, control continues to step S430. Otherwise control jumps to step S540.

In step S430, a tamper-resistant environment is established. Next, in step S440, the integrity profile is verified. Then, in step S450, a determination is made whether the integrity profile is valid. If the integrity profile is valid, control continues to step S460. Otherwise, control jumps to step S540.

In step S460, the integrity profile is loaded. Next, in step S470, the call stack of the current execution environment as illustrated in relation to FIG. 6 is constructed. At the bottom of the call stack is a set of hardware and/or devices, with all the software components towards the top of the stack. The relationship of the components in the stack is that the lower component calls the component just above it. Once the call stack is constructed, the top of the call stack, which contains the execution image of the last executed component, is located. Thus, the execution image of each component on the stack helps identify the calling component. Then, in step S480, the identification calling component is retrieved. Control then continues to step S490.

In step S490, the integrity of the component is verified against the integrity profile. Next, in step S500, a determination is made whether the component is valid. If the component is valid, control continues to step S510. Otherwise, control jumps to step S540.

In step S510, a determination is made whether the stack is empty. If the stack is empty, control jumps to step S520. Otherwise, control jumps to step S530. In step S520, the next component in the stack is located and this next component is set as the current stack frame. Control then returns to step S480 for verification.

In step S530, the integrity is verified and control continues to step S550, where the control sequence ends.

In step S540, the integrity check is failed and control continues to step S550 where the control sequence ends.

As illustrates in FIGS. 1–2, the integrity certification and verification device is preferably implemented either on a single program general purpose computer or separate program general purpose computer. However, the integrity certification and verification device can also be implemented on a special purpose computer, a programmed microprocessor or microcontroller and peripheral integrated circuit element, an ASIC, or other integrated circuit, a digital signal processor, a hard-wired electronic or logic circuit such as a discrete element circuit, a programmable logic device such as a PLA, PLD, FPGA, PAL, or the like. In general, any device capable of implementing a finite state machine that is in turn capable of implementing the flowcharts illustrated in FIGS. 11–14 can be used to implement integrity certification and verification device.

Furthermore, the disclosed method may be readily implemented in software using object or object-oriented software development techniques in environments that provide portable source code that can be used in a variety of computer or workstation hardware platforms. Alternatively, the disclosed integrity ce cation and verification device may be implemented partially or fully in hardware using standard logic circuits or a VLSI design. Whether software or hardware is used to implement the systems and methods in accordance with this invention is dependent on the speed and/or efficiency requirements of the system, the particular function, and particular hardware or software systems or microprocessor or microcomputer system being utilized. The integrity certification and verification devices and methods described above, however, can be readily implemented in hardware or software, using any known or later-developed systems or structures, devices, and/or software by those skilled in the applicable art without undue experimentation from the functional description provided herein, together with a general knowledge of the computer arts. Moreover, the disclosed methods may be readily implemented as software executed on a programmed general purpose computer, a special purpose computer, a microprocessor, a server or the like. In this case, the methods and systems of this invention can be implemented as a routine embedded on a personal computer or server, such as a JAVA® or CGI script as a resource residing on a server or graphics work station as a routine embedded in a dedicated integrity certification and verification device, a web browser, a web TV interface, a PDA interface, a multimedia presentation device, or the like. The integrity certification and verification device can also be implemented by physically incorporating the systems and methods into a software and/or hardware system, such as the hardware and software systems of a graphics workstation or dedicated integrity certification and verification device.

It is, therefore, apparent that there has been provided, in accordance with the present invention, systems and methods for integrity verification. While this invention has been described in conjunction with the preferred embodiments thereof, it is evident that many alternatives, modifications and variations be apparent to those skilled in the applicable art. Accordingly, applicants intend to embrace all such alternatives, modifications, and variations that follow within the spirit and scope of this invention.

What is claimed is:

1. A system for providing integrity certification and verification within content consumption or computing environments, said system comprising:

an identification and integrity certification and verification device, including:

a component registration database storing authentication information about one or more applications, systems or system components;

an integrity profile database storing at least one integrity profile including verifiable information defining an authentic environment that is used to determine the authenticity of a collection of the one or more applications, systems or system components of a content consumption or computing environment and the authenticity of an interrelationship or dependency among the collection of the one or more applications, systems or system components;

a profile creation device coupled to the integrity profile database and the component registration database and which maintains the integrity profile and creates the integrity profile based on the authentication information about the one or more applications, systems or system components stored in the component registration database;

a profile verification device coupled to the integrity profile database and which verifies authenticity by comparing one or more of application, system or system component identifications, specified in the integrity profile with one or more applications, systems or system components of the content consumption or computing environment;

a component registration device coupled to the component registration database and which obtains the authentication information about the one or more applications, systems or system components from a content consumption or computing application, system or system component provider and provides the authentication information to the component registration database; and a profile distribution device coupled to the integrity profile database and which receives an identification of the integrity profile and determines if the integrity profile corresponding to the integrity profile identification is available;

wherein the component registration device receives a component identification associated with the one or more applications, systems or system components of the content consumption or computing application, system or system component provider;

the component registration device registers the one or more applications, systems or system components of the content consumption or computing application, system or system component provider; and the component registration device returns the component identification of the registered applications, systems or system components to the content consumption or computing application, system or system component provider.

2. The system of claim 1, wherein the integrity profile includes an identification of registered applications, systems or system components having authentication information stored in the component registration device.

3. The system of claim 1, wherein the integrity profile comprises an identification of the one or more applications, systems or system components of the content consumption or computing environment.

4. The system of claim 1, further comprising a content provider system coupled to the content consumption or computing environment.

5. The system of claim 1, further comprising a content consumption or computing application, system or system component provider system coupled to the content consumption or computing environment.

6. The system of claim 1, wherein, if a request for access is received, the profile verification device determines the authenticity of the one or more applications, systems or system components of the content consumption or computing environment and, if the one or more applications, systems or system components are not authentic, denies access to one or more documents in the content consumption or computing environment.

7. The system of claim 1, wherein the identification and integrity certification and verification device is configured for certifying the integrity profile by comparing the integrity profile with the authentication information stored in a component registration database.

8. The system of claim 1, further comprising access rights for at least one of enabling or disabling access to content associated with the content consumption or computing environment.

9. The system of claim 1, wherein the identification and integrity certification and verification device is configured for digitally signing the integrity profile.

10. The system of claim 9, wherein the identification and integrity certification and verification device is configured for forwarding the digitally signed integrity profile to the content consumption or computing environment.

11. The system of claim 1, wherein the identification and integrity certification and verification device is configured for establishing a tamper resistant environment.

12. The system of claim 1, wherein the profile verification device is configured for verifying the integrity profile.

13. The system of claim 1, wherein the identification and integrity certification and verification device is configured for establishing that the one or more applications, systems, or system components of the content consumption environment is not being at least one of monitored, controlled or recorded by an unauthorized device.

14. The system of claim 1, wherein the content consumption or computing application, system or system component provider communicates with the identification and integrity certification and verification device to request registration of the one or more applications, systems or system components.

15. The system of claim 1, wherein the identification and integrity certification and verification device communicates with the content consumption or computing application, system or system component provider to secure the authentication information.

16. The system of claim 15, wherein the authentication information includes one of a provider name, a component identification, a serial number, a version number, and a build number associated with the one or more applications, systems or system components.

17. The system of claim 1, wherein the identification and integrity certification and verification device acquires the one or more applications, systems or system components of the content consumption or computing environment from the content consumption or computing application, system or system component provider.

18. The system of claim 1, wherein the component registration device computes a hash value as an identification for authenticating the one or more applications, systems or system components of the content consumption or computing environment.

19. The system of claim 18, wherein the component registration device stores the hash value in the component registration database.

20. A system for providing integrity certification and verification within content consumption or computing environments, said system comprising:

an identification and integrity certification and verification device, including:

a component registration database storing authentication information about one or more applications, systems or system components;

an integrity profile database storing at least one integrity profile including verifiable information defining an authentic environment that is used to determine the authenticity of a collection of the one or more applications, systems or system components of a content consumption or computing environment and the authenticity of an interrelationship or dependency among the collection of the one or more applications, systems or system components;

a profile creation device coupled to the integrity profile database and the component registration database and which maintains the integrity profile and creates the integrity profile based on the authentication information about the one or more applications, systems or system components stored in the component registration database;

a profile verification device coupled to the integrity profile database and which verifies authenticity by comparing one or more of application, system or system component identifications, specified in the integrity profile with one or more applications, systems or system components of the content consumption or computing environment;

a component registration device coupled to the component registration database and which obtains the authentication information about the one or more applications, systems or system components from a content consumption or computing application, system or system component provider and provides the authentication information to the component registration database; and a profile distribution device coupled to the integrity profile database and which receives an identification of the integrity profile and determines if the integrity profile corresponding to the integrity profile identification is available;

wherein the content consumption or computing application, system or system component provider connects to the component registration device to download a software application.

21. The system of claim 20, wherein the software application comprises a registration application that is executed locally by the content consumption or computing application, system or system component provider.

22. The system of claim 21, wherein the registration application examines one or more applications, systems or system components of the content consumption or computing application, system or system component provider and sends authentication information pertaining thereto to the component registration device.

23. The system of claim 22, wherein the authentication information includes an integrity value, including a hash value associated with the one or more applications, systems or system components of the content consumption or computing application, system or system component provider.

24. The system of claim 22, wherein the component registration device stores the authentication information in the component registration database.

25. The system of claim 1, wherein the profile creation device builds the integrity profile for the one or more applications, systems or system components of the content consumption or computing environment.

26. The system of claim 25, wherein the profile creation device retrieves an integrity value, including a hash value for each the one or more applications, systems or system components of the content consumption or computing environment from the component registration database.

27. The system of claim 1, wherein the integrity profile includes an interaction relationship among the one or more applications, systems or system components of the content consumption or computing environment.

28. The system of claim 27, wherein the interaction relationship is used to identify a calling and returning sequence of the one or more applications, systems or system components of the content consumption or computing environment in order to prevent unintended interaction with other components.

29. The system of claim 28, wherein the integrity profile is digitally signed and the resulting signature is appended to the integrity profile.

30. The system of claim 29, wherein a unique identification is associated with the integrity profile.

31. The system of claim 1, wherein the component registration device receives meta information associated with the one or more applications, systems or system components of the content consumption or computing application, system or system component provider.

32. The system of claim 1, wherein the registration by the component registration device includes characteristics, purposes, and behaviors associated with the one or more applications, systems or system components of the content consumption or computing application, system or system component provider.

33. The system of claim 1, wherein the component registration device makes the component identification available to a content provider associated with the content consumption or computing application, system or system component provider.

34. The system of claim 1, wherein the profile creation device receives the component identification of registered components of the registered applications, systems or system components.

35. The system of claim 34, wherein the profile creation device generates the integrity profile by digitally signing and storing the component identification of the registered components of the registered applications, systems or system components in the integrity profile database.

36. The system of claim 35, wherein the profile creation device combines the component identification of the registered components of the registered applications, systems or system components with information associated therewith.

37. The system of claim 34, wherein the profile creation device returns the integrity profile identification associated with the integrity profile in response to the receipt of the component identification.

38. The system of claim 37, wherein the profile distribution device receives the integrity profile identification.

39. The system of claim 38, wherein the profile distribution device queries the integrity profile database to determine if an integrity profile corresponding to the integrity profile identification is available.

40. The system of claim 39, wherein, if an integrity profile corresponding to the integrity profile identification is available, the profile distribution device returns the integrity profile corresponding to the integrity profile identification.

41. The system of claim 39, wherein, if an integrity profile corresponding to the integrity profile identification is not available, the profile distribution device determines an integrity profile with aid from the profile creation device.

42. The system of claim 1, wherein the profile verification device receives a component identification of the one or more applications, systems or system components of the content consumption or computing environment and the integrity profile identification.

43. The system of claim 42, wherein the profile verification device compares the component identification, the integrity profile identification, and the corresponding integrity profile to determine verification data.

44. The system of claim 43, wherein, if the component identification and the integrity profile match, the profile verification device verifies the integrity of the one or more applications, systems or system components of the content consumption or computing environment.

45. The system of claim 43, wherein, if the component identification and the integrity profile do not match, the profile verification device determines that the one or more applications, systems or system components of the content consumption or computing environment are not specified in the integrity profile or the one or more applications, systems or system components of the content consumption or computing environment have been altered.

46. A device for providing identification and integrity certification and verification within content consumption or computing environments, said device comprising:
a component registration database storing authentication information about one or more applications, systems or system components;
an integrity profile database storing at least one integrity profile including verifiable information defining an authentic environment that is used to determine the authenticity of a collection of the one or more applications, systems or system components of a content consumption or computing environment and the authenticity of an interrelationship or dependency among the collection of the one or more applications, systems or system components;
a profile creation device coupled to the integrity profile database and the component registration database and which maintains the integrity profile and creates the integrity profile based on the authentication information about the one or more applications, systems or system components stored in the component registration database;
a profile verification device coupled to the integrity profile database and which verifies authenticity by comparing one or more of application, system or system component identifications, specified in the integrity profile with one or more applications, systems or system components of the content consumption or computing environment;
a component registration device coupled to the component registration database and which obtains the authentication information about the one or more applications, systems or system components from a content consumption or computing application, system or system component provider and provides the authentication information to the component registration database; and
a profile distribution device coupled to the integrity profile database and which receives an identification of the integrity profile and determines if the integrity profile corresponding to the integrity profile identification is available;
wherein the component registration device receives a component identification associated with the one or more applications, systems or system components of the content consumption or computing application, system or system component provider;
the component registration device registers the one or more applications, systems or system components of the content consumption or computing application, system or system component provider; and
the component registration device returns the component identification of the registered applications, systems or system components to the content consumption or computing application, system or system component provider.

47. The device of claim 46, wherein the integrity profile includes an identification of registered applications, systems or system components having authentication information stored in the component registration device.

48. The device of claim 47, wherein the integrity profile comprises an identification of the one or more applications, systems or system components of the content consumption or computing environment.

49. The device of claim 47, wherein a content provider system can be coupled to the content consumption or computing environment.

50. The device of claim 47, wherein a content consumption or computing application, system or system component provider system can be coupled to the content consumption or computing environment.

51. The device of claim 47, wherein, if a request for access is received, the profile verification device determines the authenticity of the one or more applications, systems or system components of the content consumption or computing environment and, if the one or more applications, systems or system components are not authentic, denies access to one or more documents in the content consumption or computing environment.

52. The device of claim 47, wherein the device is configured for certifying the integrity profile by comparing the integrity profile with the authentication information stored in a component registration database.

53. The device of claim 47, further comprising access rights for at least one of enabling or disabling access to content associated with the content consumption or computing environment.

54. The device of claim 47, wherein the device is configured for digitally signing the integrity profile.

55. The device of claim 54, wherein the device is configured for forwarding the digitally signed integrity profile to the content consumption or computing environment.

56. The device of claim 47, wherein the device is configured for establishing a tamper resistant environment.

57. The device of claim 47, wherein the profile verification device is configured for verifying the integrity profile.

58. The device of claim 47, wherein the device is configured for establishing that the one or more applications, systems, or system components of the content consumption environment is not being at least one of monitored, controlled or recorded by an unauthorized device.

59. The device of claim 47, wherein the content consumption or computing application, system or system component provider communicates with the identification and integrity certification and verification device to request registration of the one or more applications, systems or system components.

60. The device of claim 47, wherein the device communicates with the content consumption or computing application, system or system component provider to secure the authentication information.

61. The device of claim 60, wherein the authentication information includes one of a provider name, a component identification, a serial number, a version number, and a build number associated with the one or more applications, systems or system components.

62. The device of claim 47, wherein the device acquires the one or more applications, systems or system components of the content consumption or computing environment from the content consumption or computing application, system or system component provider.

63. The device of claim 47, wherein the component registration device computes a hash value as an identification for authenticating the one or more applications, systems or system components of the content consumption or computing environment.

64. The device of claim 63, wherein the component registration device stores the hash value in the component registration database.

65. A device for providing identification and integrity certification and verification within content consumption or computing environments, said device comprising:

a component registration database storing authentication information about one or more applications, systems or system components;

an integrity profile database storing at least one integrity profile including verifiable information defining an authentic environment that is used to determine the authenticity of a collection of the one or more applications, systems or system components of a content consumption or computing environment and the authenticity of an interrelationship or dependency among the collection of the one or more applications, systems or system components;

a profile creation device coupled to the integrity profile database and the component registration database and which maintains the integrity profile and creates the integrity profile based on the authentication information about the one or more applications, systems or system components stored in the component registration database;

a profile verification device coupled to the integrity profile database and which verifies authenticity by comparing one or more of application, system or system component identifications, specified in the integrity profile with one or more applications, systems or system components of the content consumption or computing environment;

a component registration device coupled to the component registration database and which obtains the authentication information about the one or more applications, systems or system components from a content consumption or computing application, system or system component provider and provides the authentication information to the component registration database; and a profile distribution device coupled to the integrity profile database and which receives an identification of the integrity profile and determines if the integrity profile corresponding to the integrity profile identification is available;

wherein the content consumption or computing application, system or system component provider connects to the component registration device to download a software application.

66. The device of claim 65, wherein the software application comprises a registration application that is executed locally by the content consumption or computing application, system or system component provider.

67. The device of claim 66, wherein the registration application examines one or more applications, systems or system components of the content consumption or computing application, system or system component provider and sends authentication information pertaining thereto to the component registration device.

68. The device of claim 67, wherein the authentication information includes an integrity value, including a hash value associated with the one or more applications, systems or system components of the content consumption or computing application, system or system component provider.

69. The device of claim 68, wherein the component registration device stores the authentication information in the component registration database.

70. The device of claim 47, wherein the profile creation device builds the integrity profile for the one or more applications, systems or system components of the content consumption or computing environment.

71. The device of claim 70, wherein the profile creation device retrieves an integrity value, including a hash value for each the one or more applications, systems or system components of the content consumption or computing environment from the component registration database.

72. The device of claim 47, wherein the integrity profile includes an interaction relationship among the one or more applications, systems or system components of the content consumption or computing environment.

73. The device of claim 72, wherein the interaction relationship is used to identify a calling and returning sequence of the one or more applications, systems or system components of the content consumption or computing environment in order to prevent unintended interaction with other components.

74. The device of claim 73, wherein the integrity profile is digitally signed and the resulting signature is appended to the integrity profile.

75. The device of claim 74, wherein a unique identification is associated with the integrity profile.

76. The device of claim 46, wherein the component registration device receives meta information associated with the one or more applications, systems or system components of the content consumption or computing application, system or system component provider.

77. The device of claim 46, wherein the registration by the component registration device includes characteristics, purposes, and behaviors associated with the one or more applications, systems or system components of the content consumption or computing application, system or system component provider.

78. The device of claim 46, wherein the component registration device makes the component identification available to a content provider associated with the content consumption or computing application, system or system component provider.

79. The device of claim 46, wherein the profile creation device receives the component identification of registered components of the registered applications, systems or system components.

80. The device of claim 79, wherein the profile creation device generates the integrity profile by digitally signing and storing the component identification of the registered components of the registered applications, systems or system components in the integrity profile database.

81. The device of claim 80, wherein the profile creation device combines the component identification of the registered components of the registered applications, systems or system components with information associated therewith.

82. The device of claim 79, wherein the profile creation device returns the integrity profile identification associated with the integrity profile in response to the receipt of the component identification.

83. The device of claim 82, wherein the profile distribution device receives the integrity profile identification.

84. The device of claim 83, wherein the profile distribution device queries the integrity profile database to determine if an integrity profile corresponding to the integrity profile identification is available.

85. The device of claim 84, wherein, if an integrity profile corresponding to the integrity profile identification is available, the profile distribution device returns the integrity profile corresponding to the integrity profile identification.

86. The device of claim 84, wherein, if an integrity profile corresponding to the integrity profile identification is not available, the profile distribution device determines an integrity profile with aid from the profile creation device.

87. The device of claim 47, wherein the profile verification device receives a component identification of the one or more applications, systems or system components of the content consumption or computing environment and the integrity profile identification.

88. The device of claim 87, wherein the profile verification device compares the component identification, the integrity profile identification, and the corresponding integrity profile to determine verification data.

89. The device of claim 88, wherein, if the component identification and the integrity profile match, the profile verification device verifies the integrity of the one or more applications, systems or system components of the content consumption or computing environment.

90. The device of claim 89, wherein, if the component identification and the integrity profile do not match, the profile verification device determines that the one or more applications, systems or system components of the content consumption or computing environment are not specified in the integrity profile or the one or more applications, systems or system components of the content consumption or computing environment have been altered.

91. A method for providing identification and integrity certification and verification within content consumption or computing environments, said method comprising:
   storing, in a component registration database, authentication information about one or more applications, systems or system components;
   storing, in an integrity profile database, at least one integrity profile including verifiable information defining an authentic environment that is used to determine the authenticity of a collection of the one or more applications, systems or system components of a content consumption or computing environment and the authenticity of an interrelationship or dependency among the collection of the one or more applications, systems or system components;
   maintaining the integrity profile and creating the integrity profile based on the authentication information about the one or more applications, systems or system components stored in the component registration database, via a profile creation device coupled to the integrity profile database and the component registration database;
   verifying authenticity by comparing one or more of application, system or system component identifications, specified in the integrity profile with one or more applications, systems or system components of the content consumption or computing environment, via a profile verification device coupled to the integrity profile database;
   obtaining the authentication information about the one or more applications, systems or system components from a content consumption or computing application, system or system component provider and providing the authentication information to the component registration database, via a component registration device coupled to the component registration database;
   receiving an identification of the integrity profile and determining if the integrity profile corresponding to the integrity profile identification is available, via a profile distribution device coupled to the integrity profile database;
   receiving, via the component registration device, a component identification associated with the one or more applications, systems or system components of the content consumption or computing application, system or system component provider;
   registering, via the component registration device, the one or more applications, systems or system components of the content consumption or computing application, system or system component provider; and
   returning, via the component registration device, the component identification of the registered applications, systems or system components to the content consumption or computing application, system or system component provider.

92. The method of claim 91, wherein the integrity profile includes an identification of registered applications, systems or system components having authentication information stored in the component registration device.

93. The method of claim 91, wherein the integrity profile comprises an identification of the one or more applications, systems or system components of the content consumption or computing environment.

94. The method of claim 91, wherein a content provider system can be coupled to the content consumption or computing environment.

95. The method of claim 91, wherein a content consumption or computing application, system or system component provider system can be coupled to the content consumption or computing environment.

96. The method of claim 91, wherein, if a request for access is received, the method further comprises determining, via the profile verification device, the authenticity of the one or more applications, systems or system components of the content consumption or computing environment and, if the one or more applications, systems or system components are not authentic, denying access to one or more documents in the content consumption or computing environment.

97. The method of claim 91, further comprising certifying the integrity profile by comparing the integrity profile with the authentication information stored in a component registration database.

98. The method of claim 91, further comprising at least one of enabling or disabling, via access rights, access to content associated with the content consumption or computing environment.

99. The method of claim 91, further comprising digitally signing the integrity profile.

100. The method of claim 91, further comprising forwarding the digitally signed integrity profile to the content consumption or computing environment.

101. The method of claim 91, further comprising establishing a tamper resistant environment.

102. The method of claim 91, further comprising verifying, via the profile verification device, the integrity profile.

103. The method of claim 91, further comprising establishing that the one or more applications, systems, or system components of the content consumption environment is not being at least one of monitored, controlled or recorded by an unauthorized device.

104. The method of claim 91, wherein the content consumption or computing application, system or system component provider requests registration of the one or more applications, systems or system components.

105. The method of claim 91, further comprising communicating with the content consumption or computing application, system or system component provider to secure the authentication information.

106. The method of claim 105, wherein the authentication information includes one of a provider name, a component identification, a serial number, a version number, and a build number associated with the one or more applications, systems or system components.

107. The method of claim 91, further comprising acquiring the one or more applications, systems or system components of the content consumption or computing environment from the content consumption or computing application, system or system component provider.

108. The method of claim 91, further comprising computing, via the component registration device, a hash value as an identification for authenticating the one or more applications, systems or system components of the content consumption or computing environment.

109. The method claim 108, further comprising storing, via the component registration device, the hash value in the component registration database.

110. A method for providing identification and integrity certification and verification within content consumption or computing environments, said method comprising:
   storing, in a component registration database, authentication information about one or more applications, systems or system components;
   storing, in an integrity profile database, at least one integrity profile including verifiable information defining an authentic environment that is used to determine the authenticity of a collection of the one or more applications, systems or system components of a content consumption or computing environment and the authenticity of an interrelationship or dependency among the collection of the one or more applications, systems or system components;
   maintaining the integrity profile and creating the integrity profile based on the authentication information about the one or more applications, systems or system components stored in the component registration database, via a profile creation device coupled to the integrity profile database and the component registration database;
   verifying authenticity by comparing one or more of application, system or system component identifications, specified in the integrity profile with one or more applications, systems or system components of the content consumption or computing environment, via a profile verification device coupled to the integrity profile database;
   obtaining the authentication information about the one or more applications, systems or system components from a content consumption or computing application, system or system component provider and providing the authentication information to the component registration database, via a component registration device coupled to the component registration database;
   receiving an identification of the integrity profile and determining if the integrity profile corresponding to the integrity profile identification is available, via a profile distribution device coupled to the integrity profile database;
   wherein the content consumption or computing application, system or system component provider connects to the component registration device to download a software application.

111. The method of claim 110, wherein the software application comprises a registration application that is executed locally by the content consumption or computing application, system or system component provider.

112. The method of claim 111, further comprising examining, via the registration application, one or more applications, systems or system components of the content consumption or computing application, system or system component provider, and sending, via the registration application, authentication information pertaining thereto to the component registration device.

113. The method of claim 112, wherein the authentication information includes an integrity value, including a hash value associated with the one or more applications, systems or system components of the content consumption or computing application, system or system component provider.

114. The method of claim 113, further comprising storing, via the component registration device, the authentication information in the component registration database.

115. The method of claim 91, further comprising building, via the profile creation device, the integrity profile for the one or more applications, systems or system components of the content consumption or computing environment.

116. The method of claim 115, further comprising retrieving, via the profile creation device, an integrity value, including a hash value for each the one or more applications, systems or system components of the content consumption or computing environment from the component registration database.

117. The method of claim 91, wherein the integrity profile includes an interaction relationship among the one or more applications, systems or system components of the content consumption or computing environment.

118. The method of claim 117, further comprising using the interaction relationship to identify a calling and returning sequence of the one or more applications, systems or system components of the content consumption or computing environment in order to prevent unintended interaction with other components.

119. The method of claim 118, further comprising digitally signing the integrity profile, and appending the resulting signature to the integrity profile.

120. The method of claim 119, further comprising associating a unique identification with the integrity profile.

121. The method of claim 91, further comprising receiving, via the component registration device, meta information associated with the one or more applications, systems or system components of the content consumption or computing application, system or system component provider.

122. The method of claim 91, wherein the registration by the component registration device includes characteristics, purposes, and behaviors associated with the one or more applications, systems or system components of the content consumption or computing application, system or system component provider.

123. The method of claim 91, further comprising making, via the component registration device, the component identification available to a content provider associated with the content consumption or computing application, system or system component provider.

124. The method of claim 91, further comprising receiving, via the profile creation device, the component identification of registered components of the registered applications, systems or system components.

125. The method of claim 124, further comprising generating, via the profile creation device, the integrity profile by digitally signing and storing the component identification of the registered components of the registered applications, systems or system components in the integrity profile database.

126. The method of claim 125, further comprising combining, via the profile creation device, the component identification of the registered components of the registered applications, systems or system components with information associated therewith.

127. The method of claim 124, further comprising returning, via the profile creation device, the integrity profile identification associated with the integrity profile in response to the receipt of the component identification.

128. The method of claim 127, further comprising receiving, via the profile distribution device, the integrity profile identification.

129. The method of claim 128, further comprising querying, via the profile distribution device, the integrity profile database to determine if an integrity profile corresponding to the integrity profile identification is available.

130. The method of claim 129, wherein, if an integrity profile corresponding to the integrity profile identification is available, the method further comprises returning, via the profile distribution device, the integrity profile corresponding to the integrity profile identification.

131. The method of claim 129, wherein, if an integrity profile corresponding to the integrity profile identification is not available, the method further comprises determining, via the profile distribution device, an integrity profile with aid from the profile creation device.

132. The method of claim 91, further comprising receiving, via the profile verification device, a component identification of the one or more applications, systems or system components of the content consumption or computing environment and the integrity profile identification.

133. The method of claim 132, further comprising comparing, via the profile verification device, the component identification, the integrity profile identification, and the corresponding integrity profile to determine verification data.

134. The method of claim 133, wherein, if the component identification and the integrity profile match, the method further comprises verifying, via the profile verification device, the integrity of the one or more applications, systems or system components of the content consumption or computing environment.

135. The method of claim 134, wherein, if the component identification and the integrity profile do not match, the method further comprises determining, via the profile verification device, that the one or more applications, systems or system components of the content consumption or computing environment are not specified in the integrity profile or the one or more applications, systems or system components of the content consumption or computing environment have been altered.

136. A computer program product including one or more computer readable instructions configured to cause one or more computer processors to perform the step recited in claim 91.

* * * * *